(12) United States Patent
Raghavan et al.

(10) Patent No.: US 8,436,726 B2
(45) Date of Patent: May 7, 2013

(54) STAGE EVALUATION OF A STATE MACHINE

(75) Inventors: Vijay Raghavan, Brookline, MA (US); Ebrahim Mehran Mestchian, Newton, MA (US)

(73) Assignee: The MathWorks, Inc., Natick, MA (US)

( * ) Notice: Subject to any disclaimer, the term of this patent is extended or adjusted under 35 U.S.C. 154(b) by 0 days.

(21) Appl. No.: 13/283,107

(22) Filed: Oct. 27, 2011

(65) Prior Publication Data

US 2012/0101971 A1 Apr. 26, 2012

Related U.S. Application Data

(63) Continuation of application No. 13/106,951, filed on May 13, 2011, now Pat. No. 8,214,783, which is a continuation of application No. 11/841,743, filed on Aug. 20, 2007, now Pat. No. 7,945,886, which is a continuation of application No. 11/237,028, filed on Sep. 28, 2005, now Pat. No. 7,500,209.

(51) Int. Cl.
*G08B 19/00* (2006.01)

(52) U.S. Cl.
USPC ............ 340/521; 340/506; 340/507; 340/511; 340/3.1

(58) Field of Classification Search .................. 340/506, 340/507, 511, 521, 3.1
See application file for complete search history.

(56) References Cited

U.S. PATENT DOCUMENTS

| | | | |
|---|---|---|---|
| 4,396,983 A | 8/1983 | Segarra et al. | |
| 5,400,246 A * | 3/1995 | Wilson et al. | 700/17 |
| 5,652,714 A | 7/1997 | Peterson et al. | |
| 5,801,687 A | 9/1998 | Peterson et al. | |
| 6,044,211 A | 3/2000 | Jain | |
| 6,324,496 B1 | 11/2001 | Alur et al. | |
| 6,408,262 B1 | 6/2002 | Leerberg et al. | |
| 6,421,815 B1 | 7/2002 | Seawright | |
| 6,463,565 B1 | 10/2002 | Kelly et al. | |
| 6,629,296 B1 | 9/2003 | Ganesan et al. | |
| 6,735,743 B1 | 5/2004 | McElvain | |
| 6,880,147 B1 | 4/2005 | Pauly | |
| 6,892,362 B1 | 5/2005 | Donaghy et al. | |
| 6,920,583 B1 | 7/2005 | Morley et al. | |
| 6,990,658 B1 | 1/2006 | Torvalds et al. | |
| 7,020,850 B2 | 3/2006 | Raghavan et al. | |
| 7,039,893 B2 | 5/2006 | DenBraber | |
| 7,043,416 B1 | 5/2006 | Lin | |
| 7,099,328 B2 | 8/2006 | Galbi et al. | |
| 7,380,224 B2 | 5/2008 | Franco et al. | |
| 7,433,808 B1 | 10/2008 | Raghavan et al. | |
| 7,454,324 B1 | 11/2008 | Seawright et al. | |
| 7,730,415 B2 | 6/2010 | Law et al. | |
| 7,945,886 B2 | 5/2011 | Raghavan et al. | |
| 2002/0023256 A1 | 2/2002 | Seawright | |

(Continued)

*Primary Examiner* — Daryl Pope

(74) *Attorney, Agent, or Firm* — Nelson Mullins Riley & Scarborough LLP

(57) ABSTRACT

The present invention provides a method and system for stage evaluation of a state machine model. Two types of transitions are used: first-stage transitions and second-stage transitions for a two-stage evaluation. In one embodiment, top-down processing and bottom-up processing may be combined using a two-stage evaluation. First-stage transitions are used with top-down processing while second-stage transitions are used with bottom-up processing. Certain conditions are used to determine if a switch from one type of stage processing to another type of stage processing is needed.

20 Claims, 8 Drawing Sheets

U.S. PATENT DOCUMENTS

| | | |
|---|---|---|
| 2004/0098240 A1 | 5/2004 | Thomason |
| 2005/0004786 A1 | 1/2005 | Thomason |
| 2005/0080600 A1 | 4/2005 | Courtay |
| 2005/0262473 A1 | 11/2005 | Kocka |
| 2005/0278670 A1 | 12/2005 | Brooks et al. |
| 2005/0278702 A1 | 12/2005 | Koyfman et al. |
| 2005/0278708 A1 | 12/2005 | Zhao et al. |
| 2006/0139587 A1 | 6/2006 | Rossing et al. |
| 2006/0235548 A1 | 10/2006 | Gaudette |
| 2007/0083352 A1 | 4/2007 | Raghavan et al. |
| 2008/0263524 A1 | 10/2008 | Adams et al. |

* cited by examiner

STAGE EVALUATION OF A STATE MACHINE

RELATED APPLICATION

This application is a continuation application of U.S. patent application Ser. No. 13/106,951, entitled "STAGE EVALUATION OF A STATE MACHINE," filed May 13, 2011, which is a continuation application of U.S. patent application Ser. No. 11/841,743, entitled "STAGE EVALUATION OF A STATE MACHINE," filed Aug. 20, 2007, and issued as U.S. Pat. No. 7,945,886, which is a continuation of U.S. patent application Ser. No. 11/237,028, entitled "STAGE EVALUATION OF A SATE MACHINE," filed Sep. 28, 2005, and issued as U.S. Pat. No. 7,500,209, the disclosure of which is incorporated by reference herein.

TECHNICAL FIELD

The present invention generally relates to state machines. More particularly, the present invention relates to staged processing of states and events in a state machine.

BACKGROUND INFORMATION

A finite state machine is a representation of an event-driven (reactive) system. In a finite state machine, a system makes a transition from one state to another provided that the condition defining the transition is true. A finite state machine may be described using a state transition table. A state transition table is a truth table describing the relationships among the inputs, outputs, and states of a finite state machine. Hence, the state transition table describes the behavior of a system given specific inputs. Alternatively, the behavior of a system may be described in terms of transitions among states. A state's activity is determined based on the occurrence of certain events under certain conditions. Additionally, a finite state machine may be graphically represented by a state diagram. A state diagram is a directed graph that illustrates transitions of one state to another. Stateflow® of MathWorks, Inc. from Natick, Mass. is an example of a technical computing software application that utilizes state diagrams to represent a finite state machine.

Stateflow® is an interactive simulation and code generation tool for event-driven systems. Stateflow® enables the representation of hierarchical states. States may be organized within other higher-level states forming a parent/offspring structure that may be used to describe complex systems. Additionally, Stateflow® allows the representation of parallel states. Hence, two or more states within the same hierarchy level may be active at the same time. Stateflow® further provides the functionalities to specify a destination state of a transition based on historical information. Stateflow® processes states and events in a top-down processing manner. In other words, Stateflow® processes states and events from the top of the hierarchy and works its way down the hierarchy. A state is processed only if it is active. If a state is active, its superstate (parent state) must also be active as well.

In Stateflow®, events drive the Stateflow® diagram execution. The occurrence of an event causes the status of the states in the Stateflow® diagram to be evaluated and often causes a transition to take place. Specifically, an event may be broadcast to trigger a transition to occur. Additionally, the broadcast of an event may also trigger an action to be executed. An action may be a function call, a broadcast event, a variable assignment, etc. An action may be executed as part of a transition from one state to another, or based on a status of a state. A transition can have either a condition action or a transition action. A condition action is executed as soon as the condition is evaluated to true but before the transition takes place. A transition action is executed after the transition takes place.

As mentioned above, Stateflow® uses a top-down processing scheme to process events and states. Specifically, when an event occurs, Stateflow® processes from the top or root of the Stateflow® state diagram down through the hierarchy of the diagram. A disadvantage of the current top-down processing implementation of Stateflow® is that it may encounter certain cyclic behaviors. An example is given with respect to FIG. 1. FIG. 1 illustrates a state chart 100 containing state 102 and state 104. State 104 further contains state 106 and state 108. Transition 100a is the default transition into state 102, which is taken when state chart 100 first becomes active. Transition 100c is the default transition into state 106, which is taken when state 104 first becomes active. Transitions 110b, 110d, and 110e are transitions from one state to another. At a certain point in time, assuming that state 108 broadcasts an error event to its parent state 104 using a send( ) function call and because Stateflow® utilizes top-down processing, the processing of the send( ) function call starts at state 104 as opposed to starting with state 106 or state 108. If state 104 does not know how to process the error event sent by the send( ) function call, then state 104 passes the error event to its active child state 108. However, state 108 cannot process this error event, and state 108 again sends the error event via a send( ) function call to its parent state 104. A cyclic behavior hence occurs. A method is needed to avoid cyclic behavior, especially when a parent state asks its child state to handle an event that the child state already knows it cannot handle. Therefore, Stateflow®'s top-down approach does not always make a finite state machine model work as expected. However, Stateflow®'s top-down approach simplifies the Stateflow® diagram by looking at the transitions out of the superstate without considering all the details of its substates and their transitions.

The Unified Modeling Language™ of Object Management Group® allows one to generate models using state diagrams. UML processes states and events in such state diagrams in a bottom-up processing manner. One of ordinary skill in the art will appreciate that bottom-up processing performs error handling better than top-down processing. However, for a superstate to make a transition to another state in a bottom-up processing environment, all the substates and their transitions must be evaluated and considered before the superstate may make a transition. Hence, some processing power is wasted on unnecessary executions of substates and transition or an undesirable transition may be made by a substate.

SUMMARY OF THE INVENTION

The present invention solves the above-identified problems by allowing multiple-stage processing. For simplicity, a two-stage processing combining top-down processing and bottom-up processing in a state diagram is demonstrated. Two types of transitions are introduced for enabling a two-stage processing, where each type of transition corresponds to a particular stage in processing the state diagram.

In one aspect of the present invention, a method of processing a representation of a state machine having states and transitions, wherein each transition has a starting point and an ending point is disclosed. The method includes the steps of providing a first evaluation stage and a second evaluation stage for processing the state machine and detecting an occurrence of an event. The method also includes the step of determining if a valid first-stage transition in the first evaluation stage exists within the representation of the state machine. If the valid first-stage transition in the first evaluation stage does not exist, the method further includes the step of determining if a valid second-stage transition in the second evaluation stage exists. In one embodiment of the present invention, the state machine is a finite state machine. In another embodiment of the present invention, the first-stage transition is an early transition and the second-stage transition is a late transition. In yet another embodiment of the present invention, the valid first-stage transition changes a current state at the starting point of the valid first-stage transition without examining any substates the current state has and the valid second-stage transition changes the current state at the starting point of the valid second-stage transition after examining all the substates that the current state has.

In one embodiment of the present invention, the step of determining if a valid first-stage transition exists further includes the step of identifying a first state that the state machine is in. The step of determining also includes the step of identifying a first first-stage transition, wherein the first first-stage transition originates from the first state and ends at a second state. The step of determining also further includes the steps of identifying a first condition corresponding to the first first-stage transition and evaluating the first condition.

In another embodiment of the present invention, the method includes the step of evaluating the first condition to true. The method also includes the step of determining that the valid first-stage transition exists. The method further includes the step of changing the state machine from the first state to the second state.

In yet another embodiment of the present invention, the method includes the step of evaluating the first condition to false. The method further includes the step of examining if the first state has a third state that is a substate of the first state. The method may also include the steps of determining that the third state exists and determining if the third state has the valid first-stage transition.

In still another embodiment of the present invention, the method includes the step of executing a first first-stage during action. The method also includes the step of throwing an exception event during the execution of the first first-stage during action. The method further includes the step of passing the exception event to a receiving state to handle. If the receiving state cannot handle the exception event, the method then includes the step of passing the exception event to a superstate of the receiving state.

In yet another embodiment of the present invention, the step of determining if a valid second-stage transition exists includes the step of identifying a first state that the state machine is in. The step of determining also includes the step of identifying a first second-stage transition that originates from the first state and ends at a second state. The step of determining further includes the steps of identifying a first condition corresponding to the first second-stage transition and evaluating the first condition.

In still another embodiment of the present invention, the method includes the steps of evaluating the first condition to true and determining that the valid second-stage transition exists. The method also includes the step of changing the state machine from the first state to the second state. The method may also include the steps of evaluating the first condition to false and determining if the first state has a third state that is a superstate of the first state. The method may further includes the steps of determining that the third state exists and determining if the third state has any valid second-stage transition.

In another aspect of the present invention, a method of handling exception events in a state machine having states and transitions is introduced. The method includes the step of detecting an occurrence of an event. The method also includes the step of initiating top-down processing of the plurality of states. The method further includes the step of detecting an exception event thrown by one of the plurality of states. The method also includes the step of receiving the exception event at a receiving state. The method further includes the step of terminating the top-down processing and initiating bottom-up processing from the receiving state.

In one embodiment of the present invention, the method further includes the step of determining if the receiving state can handle the exception event. The method may also include the steps of determining the receiving state cannot handle the exception event and passing the exception event to a superstate of the receiving state.

In another aspect of the present invention, a method of evaluating a representation of a state machine having a plurality of states and a plurality of transitions is provided. Each transition in the state machine has a starting point and an ending point. The method includes the steps of detecting an occurrence of a first event and processing the plurality of states using a first-stage evaluation. The method further includes the step of detecting an occurrence of a second event. The method also includes the steps of terminating the first-stage evaluation and processing the plurality of states using a second-stage evaluation.

In yet another aspect of the present invention, a method of creating a representation of a state machine having states and transitions is provided. The method includes the step of providing a first type of transition, wherein the first type of transition is used for processing the state machine in a first evaluation stage. The method further includes the step of providing a second type of transition, wherein the second type of transition is used for processing the state machine in a second evaluation stage. The method also includes the steps of providing a first state and a second state and creating a transition having the first state as the starting point and the second state as the ending point. The method further includes the step of specifying the transition to be either the first type of transition or the second type of transition.

In still another aspect of the present invention, a system of combining top-down processing and bottom-up processing in a state machine is disclosed. The system includes the element of a state machine model having a plurality of states and a plurality of transitions, wherein each transition starts from a starting point and ends at an ending point and each transition is classified as one of a first-stage type and a second-stage type. The system further includes the element of an application, wherein the application comprises an execution engine that generates an executable representation from the state machine model and executes the executable representation and the execution engine executes transitions of the first-stage type in a top-down processing manner and executes transitions of the second-stage type in a bottom-up processing manner.

In yet another aspect of the present invention, a system for utilizing a first-stage evaluation and a second-stage evaluation in a state machine is introduced. The system includes a state machine model having multiple states and multiple transitions. Each transition in the state machine starts from a starting point and ends at an ending point and each transition is classified as one of a first-stage type and a second-stage type. The system further includes an application, wherein the application includes an execution engine that generates an intermediate or executable representation from the state machine model.

In yet another aspect of the present invention, a computing device having a medium for storing executable instructions for a method of processing a representation of a state machine having states and transitions, wherein each transition has a starting point and an ending point, is disclosed. The method includes the steps of providing a first evaluation stage and a second evaluation stage and detecting an occurrence of an event. The method also includes the step of determining if a valid first-stage transition in the first evaluation stage exists within the representation of the state machine. If the valid first-stage transition in the first evaluation stage does not exist, the method further includes the step of determining if a valid second-stage transition in the second evaluation stage exists. In one embodiment of the present invention, the valid first-stage transition changes a current state at the starting point of the valid first-stage transition without examining any substates the current state has and the valid second-stage transition changes the current state at the starting point of the valid second-stage transition after examining all the substates that the current state has.

In still another aspect of the present invention, a computing device having a medium for storing executable instructions for a method of handling exception events in the state machine having states and transitions, wherein each transition has a starting point and an ending point, is provided. The method includes the step of detecting an occurrence of an event. The method also includes the step of initiating top-down processing of the plurality of states. The method further includes the step of detecting an exception event thrown by one of the plurality of states. The method also includes the step of receiving the exception event at a receiving state. The method further includes the step of terminating the top-down processing and initiating bottom-up processing from the receiving state.

In yet another aspect of the present invention, a computing device having a medium for storing executable instructions for a method of creating a representation of a state machine having states and transitions, wherein each transition has a starting point and an ending point, is introduced. The method includes the step of providing a first type of transition, wherein the first type of transition is used for processing the state machine in a first evaluations stage. The method further includes the step of providing a second type of transition, wherein the second type of transition is used for processing the state machine in a second evaluation stage. The method also includes the steps of providing a first state and a second state and creating a transition having the first state as the starting point and the second state as the ending point. The method further includes the step of specifying the transition to be either the first type of transition or the second type of transition. In one embodiment of the present invention, the first type of transition is used for top-down processing and the second type of transition is used for bottom-up processing.

In another aspect of the present invention, a method for generating code from a state machine model is disclosed. The method includes the step of providing a state machine model having states and transitions. Each transition in the state machine starts from a starting point and ends at an ending point and each transition is classified as one of a first-stage type and a second-stage type. The method also includes the step of generating executable code or an intermediate representation from the state machine model.

In still another aspect of the present invention, a method of evaluating transitions in stages in a representation of a state machine is introduced. The method includes the step of providing a first stage of processing and a second stage of processing. The method also includes the steps of providing a transition and associating the transition with the first stage of processing or the second stage of processing. In one embodiment of the present invention, the first stage of processing is top-down processing and the second stage of processing is bottom-up processing.

The details of various embodiments of the invention are set forth in the accompanying drawings and the descriptions below.

BRIEF DESCRIPTION OF THE DRAWINGS

The foregoing and other objects, aspects, features, and advantages of the invention will become more apparent from the following description and accompanying drawings, in which like reference characters refer to the same parts throughout the different views.

DETAILED DESCRIPTION

Figure 1:
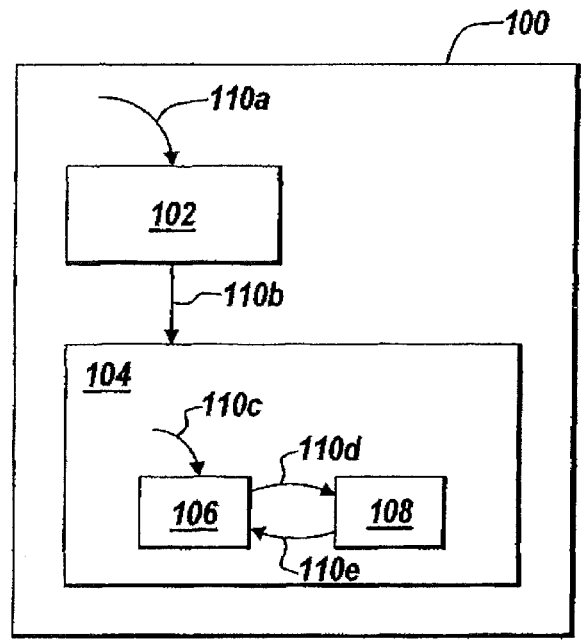
FIG. 1 illustrates an exemplary state diagram with possible cyclic behavior.

The present invention provides a method for allowing multiple-stage processing of a state machine model. Each transition in the state machine model is associated with a particular stage in the multiple-stage processing. For each stage, the transitions are defined to be processed at a particular processing point of the evaluation of the state machine. For example, in a three-stage processing, a transition may be indicated to be associated with the first stage, the second stage, or the third stage. A transition associated with the first stage may be defined such that the transition should be taken by the source state without considering any substates of the source state. A transition associated with the second stage may be defined that the transition should be taken by the source state if no valid transitions may be taken by any of its immediate substate. A transition associated with the third stage may be defined that the transition should be taken by the source state if no valid transitions may be taken by any of its substates. One of ordinary skill in the art will appreciate that the multiple-stage processing of a state machine model can overcome disadvantages in using a single-stage processing, such as top-down processing or bottom-up processing.

In the following paragraphs, a detailed explanation is presented to show how a multiple-stage processing works in evaluating a state diagram that represents a state machine. For simplicity, a two-stage processing combining top-down processing and bottom-up processing is demonstrated. One of ordinary skill in the art will recognize that multiple-stage processing is inherently different from single-stage processing and that neither top-down processing nor bottom-up processing is needed in a multiple-stage processing. One of ordinary skill in the art will appreciate that the illustrated embodiments are used to demonstrate the spirit of the present invention and should not be used to limit the scope of the present invention. The illustrated embodiments will be described for illustrative purposes relative to Stateflow® from The MathWorks, Inc.; however one of ordinary skill in the art will appreciate that the present invention is not limited to Stateflow® and may be applied to other applications, such as the Unified Modeling Language™ of Object Management Group® or other state diagramming applications. One of ordinary skill in the art will also appreciate that although the illustrated embodiments will be described for illustrated purposes relative to a finite state machine, the present invention may also be applied to infinite state machines having an infinite number of states, such as some examples of Petri nets.

A Stateflow® state diagram is also referred to as a "state chart". A state chart is formed of states and transitions. Each state relates to a state of a finite state machine. Each state may have a superstate. A superstate is also sometimes referred to as a parent state. A state is always lower in hierarchy than its superstate or parent state. A state that is a child of a superstate is referred to as a substate of its superstate, or a child state of its parent state. A state may have more than one immediate substate or child state. However a state may only have at most one immediate superstate or parent state. The activity or inactivity of a state changes dynamically based on transitions that are enabled by events and/or conditions. When a Stateflow® state chart is active, it only considers the active states and their transitions. A Stateflow® state chart executes when it is triggered by an event. A state chart is initially inactive when it is first triggered by an event. After the trigger, the state chart becomes active and once it finishes processing the trigger event, the state chart goes to sleep and waits for another event to occur. When another event takes place, the state chart wakes up and processes the event. All events are processed top-down. The existing implementation of Stateflow® only allows top-down processing of events and states, but not bottom-up processing of events and states.

To introduce bottom-up processing into Stateflow®, two types of transitions are utilized to enable the differentiation of the two stages of evaluation, top-down processing and bottom-up processing, of a two-stage processing in Stateflow®. One type of transition associated with top-down processing is referred here as an early transition, and the other type associated with bottom-up processing is referred as a late transition. Early transitions can also be referred to as regular transitions, or transitions of a regular type. Late transitions can be referred to as deferred transitions, or transitions of a deferred type. Each transition has a source (a starting point) and a destination (an ending point). A source can be either an explicit state or an implicit state that can cause a transition into a state at the destination. For example, in a graphical user interface, a source can be explicitly defined by connecting the beginning of a transition path to a graphical boundary of a state. Alternatively, a source can be implicitly defined as in the case of a default transition inside the boundary of a parent state. In this case, the source of the transition can be any state in the finite state machine model with a transition path into the parent state. Each transition may have a corresponding condition, where the transition will only take place if the condition is true and the source state of the transition is active. Given a transition having state A as the source and state B as the destination, a finite state machine may change its state from state A to state B via the transition. If the transition is an early transition, then once the transition condition is true, the transition takes place without considering any substate that state A might have. However, if the transition type is a late transition, then the transition will not be considered until no other transition may be made by either state A or any of its child states. A transition is represented graphically using an arrow in Stateflow®. A transition is implemented as an object in Stateflow®. A transition object specifies who are the source (a beginning point of the transition) and the destination (an ending point of the transition). A transition may take place in response to an occurrence of an event.

The occurrence of an event causes a state chart to wake up and start evaluating the active states in the state chart. An event can represent the point at which the temperature in a room exceeds a given temperature. An event can represent the point that water in a container reaches its top level shutting off of the water input source. Events are represented as non-graphical objects in Stateflow®. Alternatively, events may be represented using a conditional statement in code.

When a state is being evaluated, an action may be executed, which is called a "during action". A during action may further be divided into an "early during action" and a "late during action", where the early during action is executed during top-down processing, and the late during action is executed during bottom-up processing. An "early during action" and "late during action" may be implemented as function calls. If a state has an early transition, then the checking of the early transition will be included in an "early during action" function call. On the other hand, if a state has a late transition, then the checking of the late transition will be included in a "late during action" function call. A state may further include an "entry action" and an "exit action", where the entry action is executed when the state first becomes active, and the exit action is executed right before the state becomes inactive. An "entry action" and "exit action" may also be implemented using function calls. When the state chart finishes evaluating the active states and optionally making a transition under certain condition, the state chart goes back to sleep and waits for another event to take place. One of ordinary skill in the art will appreciate that there are many ways other than function calls in which "during action", "entry action" and "exit action" may be implemented.

Stateflow® processes all early transitions using top-down processing and all late transitions using bottom-up processing. Therefore a user may specify a transition to be an early transition if the user wants the transition to be processed top-down or a user may specify a transition to be a late transition if the user wants the transition to be processed bottom-up. One of ordinary skill in the art will appreciate that the type of transition may be specified or changed using methods such as a mouse right-click menu, property dialog box, and command line API.

Figure 2A:
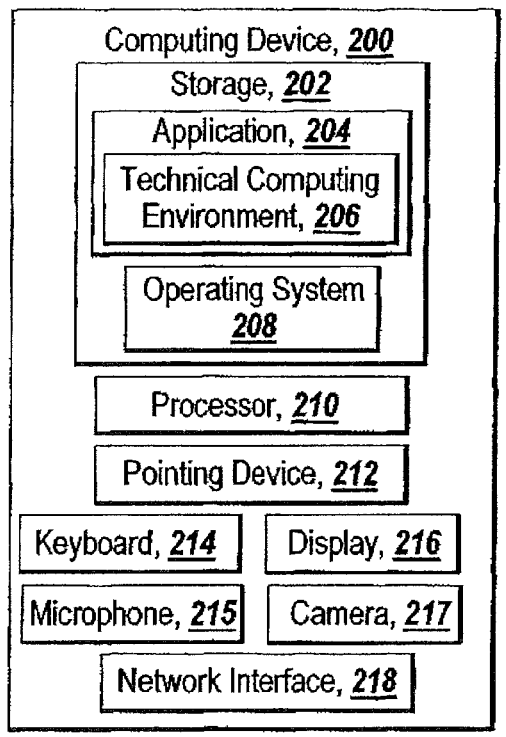
FIG. 2A illustrates an exemplary environment that is suitable for practicing one embodiment of the present invention.

FIG. 2A illustrates an exemplary environment that is suitable for practicing one embodiment of the present invention. Computing Device 200 includes a storage 202, such as a hard drive or CD-ROM, for storing application 204 and operating system 208. Application 204 provides a technical computing environment 206 for executing a finite state machine model. The finite state machine model may be a graphical representation of a state machine, a state transition table, or the like. Computing device 200 may be any computer system, such as a desktop computer, laptop, workstation, server, handheld computer, or other forms of computing or telecommunication device that is capable of communication and that has sufficient computing power to perform the operations described herein. Computing device 200 further includes a display 216 through which a user may interface with computing device 200 using I/O devices such as a microphone 215, a camera 217, a keyboard 214 and a pointing device 212, such as a mouse or a stylus. Computing device 200 also includes a processor 210 for running operating system 208, application 204, and other software in storage 202. Computing device 200 may also further include a network interface 218 to interface to a Local Area Network (LAN), Wide Area Network (WAN) or the Internet through a variety of connections including, but not limited to, standard telephone lines, LAN or WAN links, broadband connections, wireless connections, or some combination of any or all of the above. The network interface 218 allows computing device 200 to interface with another computing device that is capable of execution in a distributed and/or parallel computing environment.

Figure 2B:
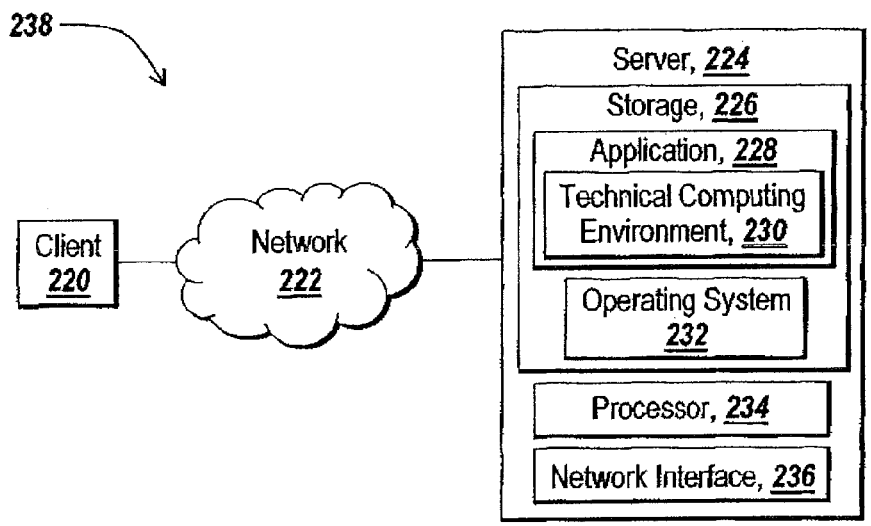
FIG. 2B illustrates another exemplary environment that is suitable for practicing one embodiment of the present invention.

FIG. 2B illustrates another exemplary environment suitable for practicing one embodiment of the present invention. This environment is a client-server computing environment. Client 220 is coupled to network 222, such as the Internet, or an intranet, or other network either wired, wireless, or a hybrid of wired or wireless, to communicate with a server 224 that interfaces to network 222 using a network interface 236. Server 224 is adaptable to also include a processor 234 and storage 226 for storing operating system 232 and an application 228 which includes a technical computing environment 230. Client 220 may be a computing device such as computing device 200. Client 220 may or may not have a copy of application 228 in its own storage. Client 220 also may or may not have enough processing power to execute application 228. Those skilled in the art will recognize that there are many different ways one may practice the present invention in a client-server computing environment.

Figure 2C:
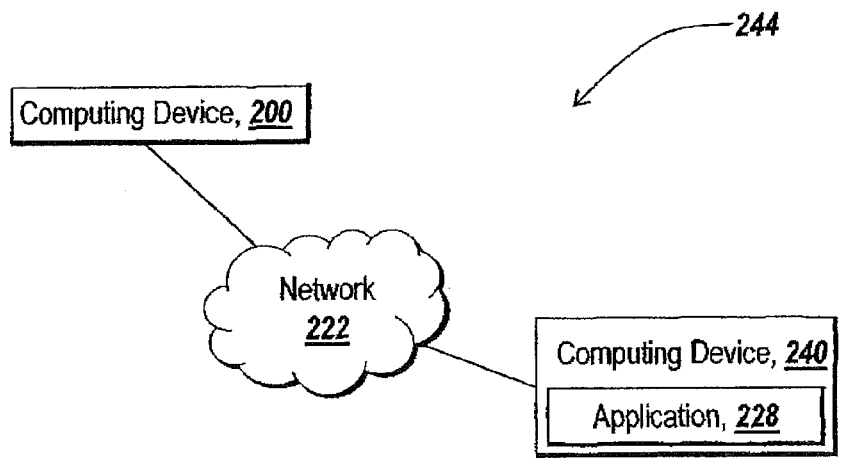
FIG. 2C illustrates yet another exemplary environment that is suitable for practicing one embodiment of the present invention.

FIG. 2C depicts another exemplary distributed computing environment that is suitable to practice one embodiment of the present invention. In this distributed environment, computing device 200 and computing device 240 are coupled to network 222. Computing device 240 includes at least an application 242 for executing a portion of a finite state machine model. One of ordinary skill in the art will appreciate that execution of a state machine model may be distributed in many different ways in a distributed computing environment.

Figure 3:
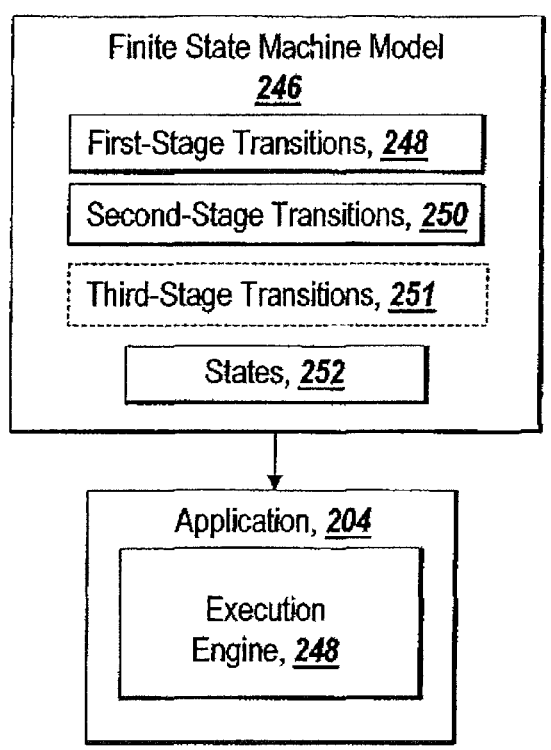
FIG. 3 illustrates an exemplary system that is suitable for practicing one embodiment of the present invention.

FIG. 3 illustrates a number of the components used in the illustrative embodiment to practice the present invention. One of the components is a finite state machine model 246, which may be held in storage 202 (see FIG. 2A). The finite state machine model 246 organizes its building blocks into three categories: states 252, first-stage transitions 248, second-stage transitions 250, and optionally third-stage transitions 251 and other additional stage transitions. Finite state machine model 246 is supplied to application 204 for code generation and execution by execution engine 248.

Execution engine 248 is capable of taking the finite state machine model 246 and generating corresponding executable code. The high level representation of the finite state machine model 246 can be translated to low level code for execution. As way of an example, Stateflow® uses textual action language to describe states and transitions in a finite state machine model. The textual action language statements in each Stateflow® object (states and transitions) are first parsed and translated to Abstract Syntax Trees (ASTs). One of ordinary skill in the art will appreciate that there are many other structures and intermediate representation that can be used to describe states and transitions. The generated ASTs are then attached to their corresponding Stateflow® object. The semantics of the finite state machine model is then analyzed and an intermediate representation of the finite state machine model is generated using Code Generation Intermediate Representation (CGIR). CGIR has basic objects, such as, types, constants, variables, and functions, to represent elements of a finite state machine built in Stateflow®. States and various types of functions in the finite state machine get translated into CGIR functions. Transitions and junctions yield control-flow graphs (CFGs) that form the bodies of the functions. CFGs show how functions call each other in order to achieve a specific processing and execution of a finite state machine model. CFGs are constructed using the CGIR functions to capture the high-level notions of a finite state machine, such as, activating and inactivating a state.

Analysis and optimizations are applied to the CGIR representation of the finite state machine model to transform the CGIR representation to a lower-level representation that is convertible to a desired low level target language that can be compiled by a general purpose compiler, such as a C/C++ compiler, to generate executables that can numerically reproduce the simulation scenarios described in the original finite state model. The target language may be C/C++, HDL, JAVA programming language, Ada, and the like. The process of transforming the CGIR representation to a lower-level representation that is convertible to a desired low level target language is referred to as "lowering". There may be many stages of lowering processes in the transformation of the CGIR representation to a lower-level representation. The same lowering process may be employed more than once. The purpose of these lowering processes is to transform the CGIR representation to a state that is most suitable to the backend of the code generation process. Optimizations may also be employed in the code generation process to improve the efficiency and the effectiveness of the generated code as well as the code generation process itself. As way of an example, a vector is used in a finite state machine model and the target language is C, then one of the lowering processes can be transforming calculations related to the vector to a for loop. For example, given an expression $y=x1+x2;$ where all the variables in the expression represent vectors, the expression can be translated into a for loop such as the following:

for $(i=0; i<n; i++)\{y[i]=x1[i]+x2[i];\}$

Once the CGIR representation has been transformed into a lower-level representation, a backend utility of CGIR is used to generate executable code in the target language.

A staged evaluation of transitions allows the code to be generated where it needs to be in a sequential set of instructions. In the case of preemption semantics, references may be required in the generated code to jump to the code fragment that needs to be executed, and hence less efficient code is generated using preemption semantics as done in related applications of finite state machine.

Referring back to FIG. 3, Execution engine 248 also is capable of executing finite state machine model 246 in a multiple-stage processing manner, and in the specific example of two-stage processing, a top-down processing manner or a bottom-up processing manner. In one embodiment of the present invention, first-stage transitions 248 are processed by the execution engine 248 in a top-down processing manner while second-stage transitions 250 are processed by the execution engine 248 in a bottom-up processing manner. In another embodiment of the present invention, states in states 252 may be processed by either top-down or bottom-up depending on the type of the transitions that are being processed at a certain point during execution. Stateflow® uses top-down processing by default, but can be modified to switch to bottom-up processing under certain circumstances. For example, when an exception event is thrown by a state, the execution engine 248 changes to bottom-up processing to process the exception event. Another example is when execution engine 248 has finished top-down processing of all the active states and that it encounters one or more late transitions while it traverses down the state hierarchy, then execution engine 248 changes from top-down processing to bottom-up processing after reaching the bottom of the state hierarchy (a leaf state). One of ordinary skill in the art will appreciate that the coordination of top-down processing and bottom-up processing may be implemented in many different ways. For example, in Stateflow®, "early during actions" are called before "late during actions" to ensure that early transitions are considered before late transitions. However, one of ordinary skill in the art will appreciate that the scope of the present invention is not limited to this specific order of processing and the present invention also allows other order of processing, such as first bottom-up processing then top-down processing or a combination of bottom-up and top-down processing.

Figure 4:
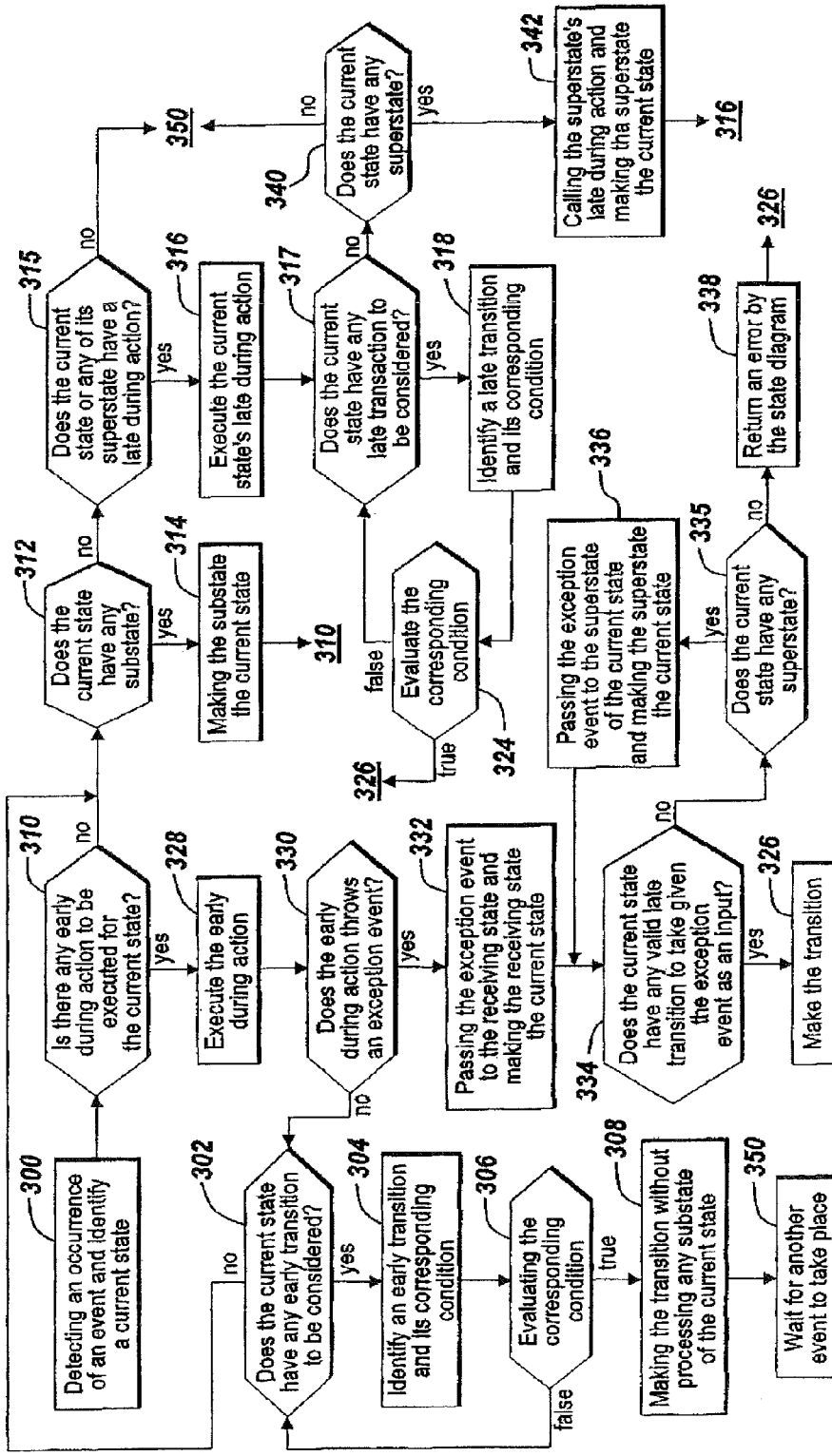
FIG. 4 shows a flow chart that depicts the steps taken to practice one embodiment of the present invention.

FIG. 4 illustrates a flow chart depicting steps taken to practice one embodiment of the present invention. A Stateflow® state chart wakes up after detecting an occurrence of an event and identifies a current state in step 300. A current state is a state that is presently being evaluated or processed by the execution engine 248. Since the state chart just wakes up, execution engine 248 initiates top-down processing of the active states. Execution engine 248 proceeds to step 310 to check if there is any early during action function call that needs to be executed prior to checking if the current state has any substate. If the current state does have an early during action, the early during action is executed in step 328. Execution engine 248 checks if the early during action throws an exception event in step 330. If an exception event is thrown, execution engine 248 stops top-down processing and switches to bottom-up processing. Execution engine 248 passes the exception event to the receiving state and makes the receiving state the current state in step 332. Execution engine 248 then checks in step 334 if the current state has any valid late transition to take given the exception event as an input. If there is a valid late transition, the transition is taken in step 326 and the state chart goes to sleep and waits for another event to happen in step 350. If in step 334, the current state does not have any valid late transition to take, execution engine 248 checks in step 335 if the current state has any superstate. If the current state does not have any superstate, then an error is returned by state chart in step 338. Otherwise, execution engine 248 passes the exception event to the superstate of the current state and makes the superstate the current step in step 336, after which the execution engine 248 returns to step 334.

If back in step 310, the current state does not have any early during action to execute, execution engine 248 proceeds to step 312 to check if the current state has any substate. If the current state has at least one sub state, execution engine 248 makes the immediate active substate as the current state in step 314 and returns to step 310.

Back in step 330, if no exception event is thrown, execution engine 248 proceeds to step 302 to check if the current state has any early transition to be considered. If the current state has at least one early transition, execution engine 248 identifies an early transition and its corresponding condition in step 304. Then execution engine 248 evaluates the corresponding condition in step 306. If the condition is evaluated to true, the transition is taken in step 308 without processing any substate that the current state might have. If the current state has any exit action, the exit action is executed before the transition is made to a next state. If the next state has any entry action, the entry action is executed after the transition is made. The state chart then goes to sleep and waits for another event to take place in step 350. If in step 306, the condition is evaluated to false, execution engine 248 returns to step 302.

If in step 302, the execution engine 248 cannot find any early transition to consider because either all available early transitions have been considered or the current state does not have any early transition, execution engine 248 proceeds to 312 to check if the current state has any substate.

If in step 312, the execution engine 248 does not find any substate, execution engine 248 moves to step 315 and checks if the current state or any of its superstate have a late during action. If not, then the state chart goes to sleep and waits for another event to take place in step 350. If the current state or at least one of its superstates has a late during action, execution engine 248 stops top-down processing and switches to bottom-up processing. Execution engine 248 then executes the current state's late during action in step 316. Next, execution engine 248 checks if the current state has any late transition to consider in step 317. If the current state has at least a late transition, execution engine 248 identifies a late transition and its corresponding condition in step 318. The corresponding condition is then evaluated in step 324. If the condition is evaluated to true, the late transition is taken in step 326 and the state chart goes to sleep and waits for another event to occur in step 350. If the condition is evaluated to false, execution engine 248 returns to step 316.

If in step 317, the current state does not have any late transition to consider because either all the late transitions have been considered or the current state does not have any late transition, execution engine 248 proceeds to step 340 to check if the current state has any superstate. If the current state does not have any superstate, the state chart goes to sleep and waits for another event to take place in step 350. On the other hand, if the current state does have at least one superstate, execution engine 248 calls the superstate's late during action and makes the immediate superstate the current state in step 342 and returns to step 316. The execution engine 248 continues up the state hierarchy to find a valid late transition. If one is found, the transition is taken. Otherwise, the exception event is passed to state chart and an error is returned by the state chart.

Figure 5A:
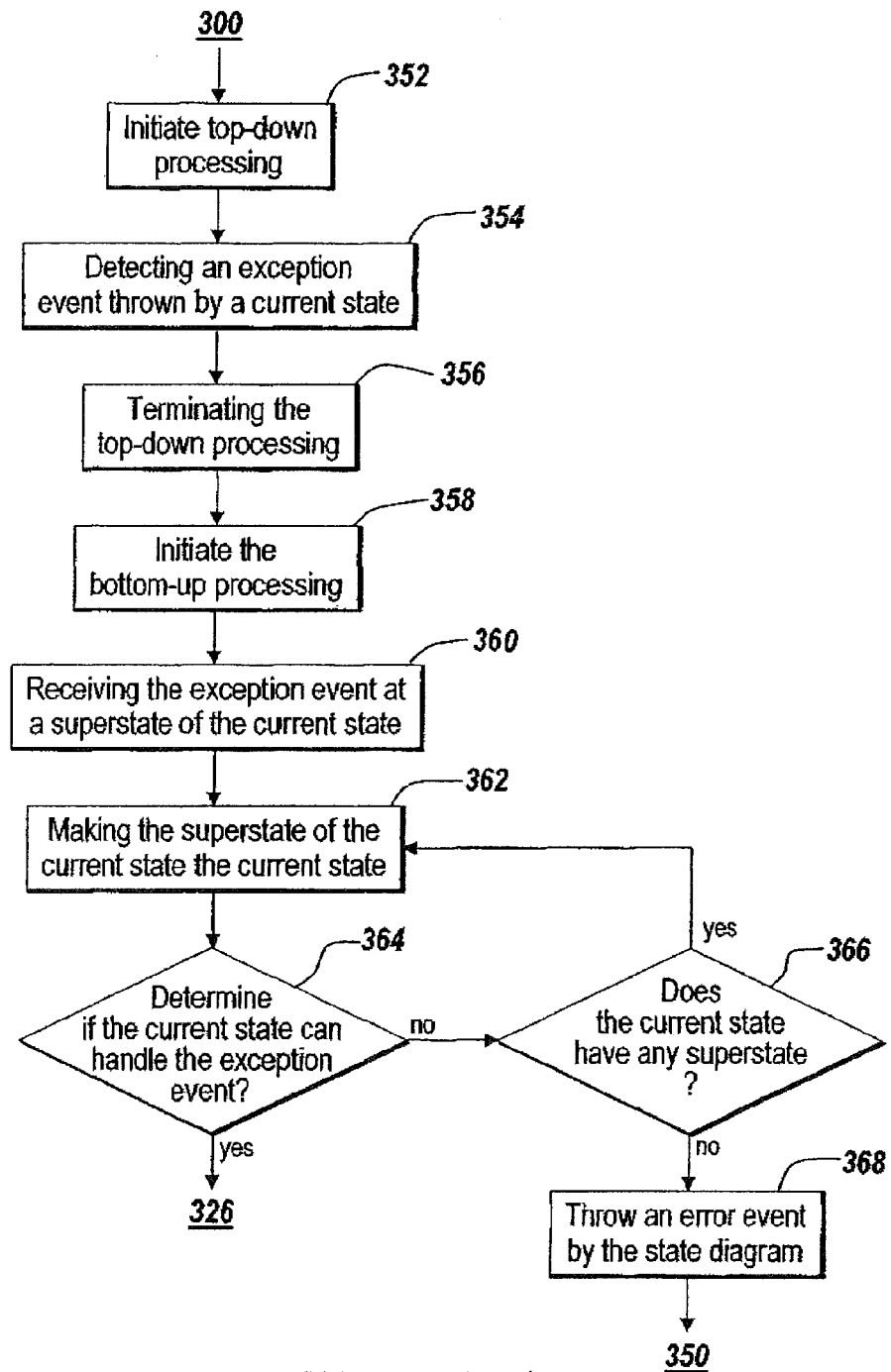
FIG. 5A shows another flow chart that depicts the steps taken to practice one embodiment of the present invention.
Figure 5B:
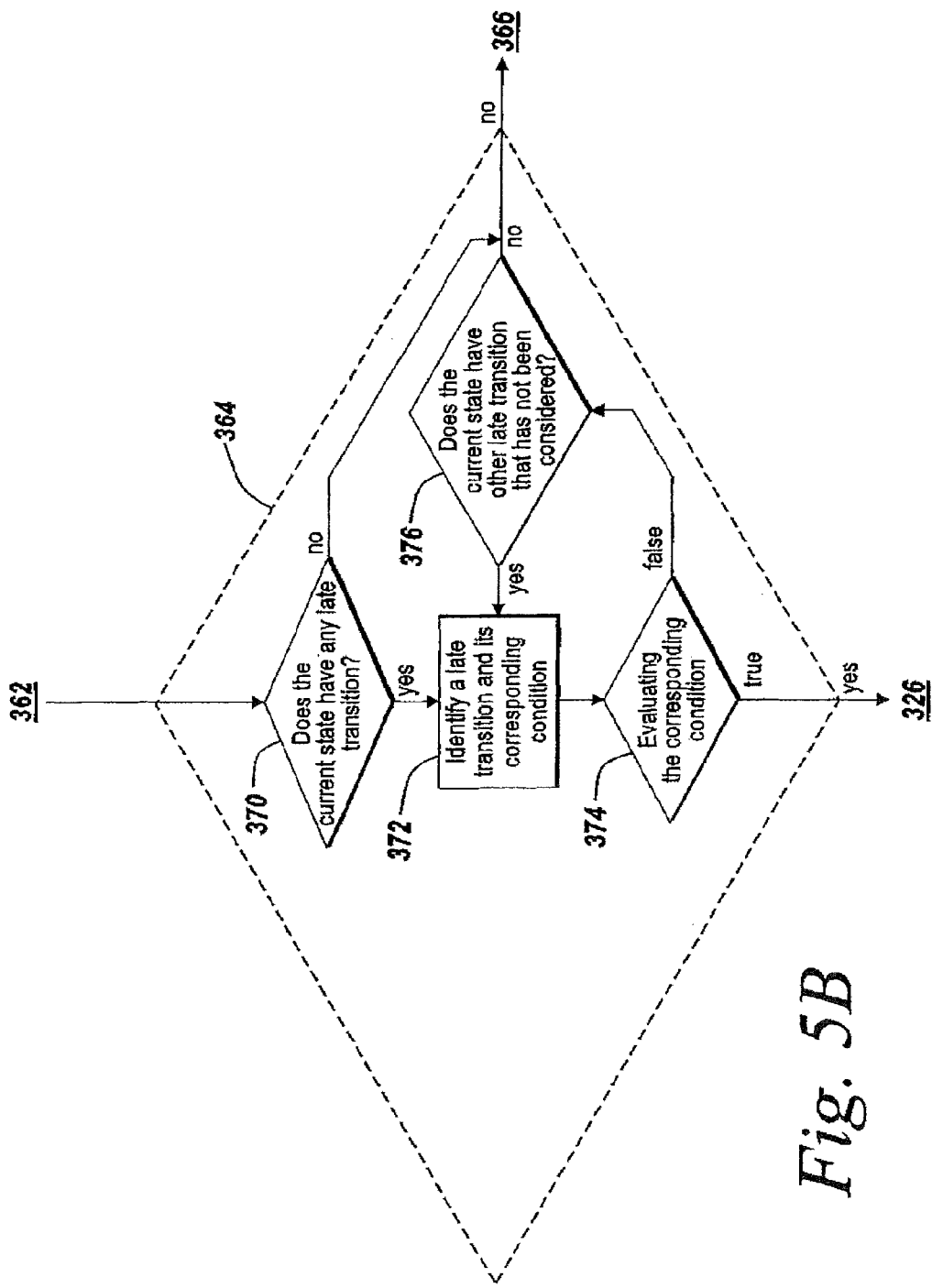
FIG. 5B shows the detailed steps taken as part of step 364 of FIG. 5A.

FIGS. 5A and 5B show another flow chart to practice one embodiment of the present invention. After an occurrence of an event is detected, the state chart initiates top-down processing in step 352. The state chart processes the states in the finite state machine in a top-down manner and attempts to find an early transition to take. When the state chart detects an exception event thrown by a current state in step 354 prior to finding an early transition to take, the state chart terminates top-down processing in step 356 and initiates bottom-up processing in step 358. The exception event is received at the immediate superstate of the current state in step 360. The superstate is made the current state in step 362. The state chart determines if the exception event can be handled at the current state in step 364. If the exception event can be handled, then the state chart proceeds to step 326. If the exception event cannot be handled by the current state, then the state chart checks if the current state has any superstate in step 366. If the current state has a superstate, then the state chart goes back to step 360. If the current state does not have any superstate, the state chart throws an error event in step 368 and then proceeds to 350 to sleep and wait for another event to take place.

FIG. 5B shows in detail the steps taken to determine if the current state can handle the exception event in step 364. The state chart first checks if the current state has any late transition in step 370. If the current state does not have any late transition, the state chart proceeds to step 366. If the current state has a late transition, the state chart identifies a late transition and its corresponding condition in step 372. Next, the state chart evaluates the corresponding condition in step 374. If the condition is evaluated to true, the state chart proceeds to step 326. If the condition is evaluated to false, the state chart then checks if the current state has another late transition that has not been considered in step 376. If the current state has another late transition that has not been considered, the state chart goes back to step 372 to identify another late transition. If the current state has no late transition that has not been considered, the start chart proceeds to step 366.

Figure 6A:
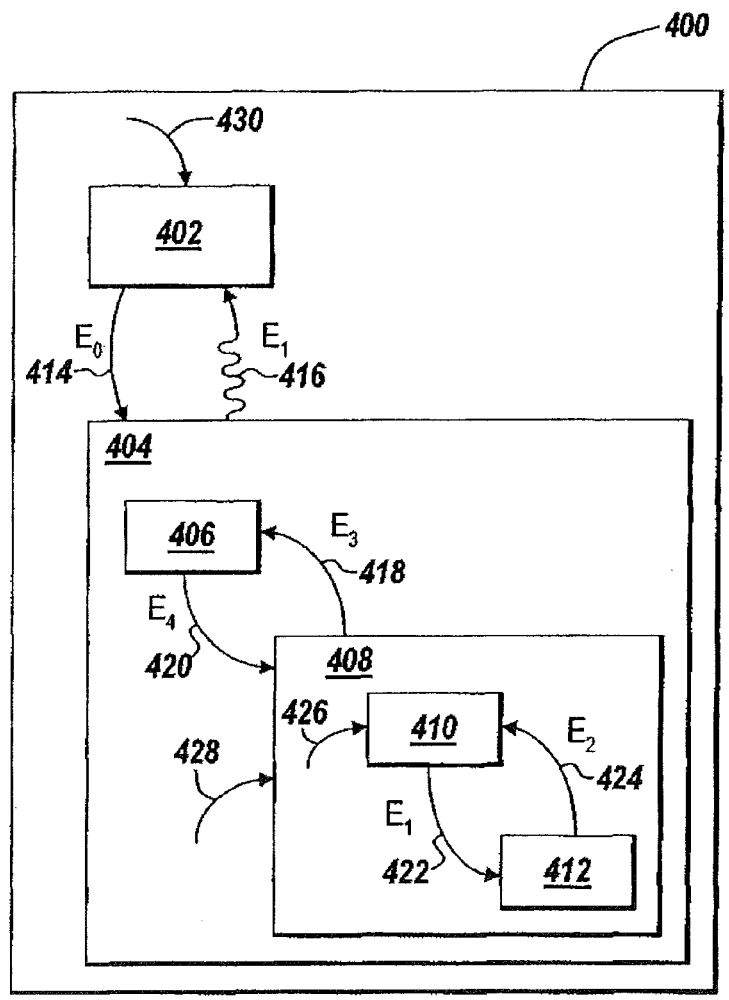
FIG. 6A illustrates an exemplary state diagram that practices one embodiment of the present invention.

FIG. 6A is an exemplary state diagram that helps to illustrate the steps of FIG. 4. State chart 400 includes state 402 and state 404 at the first level of hierarchy. Transition 430 is a default transition that specifies that state 402, instead of state 404, is entered by default when the state chart 400 first becomes active. State 402 may make a transition to state 404 via early transition 414. Early transitions are denoted graphically by a regular arrow whereas late transitions are denoted graphically by an arrow with a curly tail. One of ordinary skill in the art will appreciate that many different visual affordances may be used to designate a transition of a specific stage and the scope of the present invention is not limited to a specific visual affordance for both the early transitions and late transitions. Early transition 414 only takes place if it is triggered by an event $E_0$. State 404 may make a transition to state 402 via late transition 416 when an event $E_1$ occurs. Late transitions are not usually considered and taken until all the possible early transitions are considered. State 404 includes state 406 and state 408. Both state 406 and state 408 are immediate substates of state 404. State 404 is a superstate of both state 406 and state 408. Default transition 428 specifies that by default, state 408 is entered instead of state 406. State 406 may make a transition to state 408 via early transition 420 when event $E_4$ takes place. State 408 may make a transition to state 406 via early transition 418 if event $E_3$ occurs. State 408 includes state 410 and state 412. Default transition 426 specifies that state 410 is entered instead of state 412 by default. State 410 may make a transition to state 412 via early transition 422 if event $E_1$ occurs. On the other hand, state 412 may make a transition back to state 410 via early transition 424 if event $E_2$ occurs.

Assuming that at a point during the execution, state chart 400 wakes up because of an occurrence of an event $E_1$ and state 404, state 408 and state 410 are active. Execution engine 248 identifies the current state as state 404 in step 300 and checks in step 310 if state 404 has any early during action to be executed. State 404 does not have any early during action, so execution engine 248 checks in step 312 if the current state has any substate. Since state 404 does have at least one substate, execution engine 248 makes the immediate active substate 408 the current state in step 314 and returns to step 310.

In step 310, execution engine 248 checks if state 408 has any early during action to be executed and executes the early during action in step 328. There is no exception event thrown in the early during action in step 330 so execution engine 248 proceeds to step 302. In step 302, execution engine 248 finds that state 408 has at least one early transition to be considered and identifies early transition 418 and its corresponding condition in step 304. The corresponding condition is then evaluated in step 306. Execution engine 248 evaluates the condition to false and returns to step 302 to check if state 408 has any other early transition to be considered. Since state 408 does not have any other early transition other than early transition 418, execution engine 248 proceeds to step 312. In step 312, execution engine 248 checks if the state 408 has any substate. Execution engine 248 finds that state 408 has at least one substate, and proceeds to step 314 to make the immediate active substate 410 the current state. Execution engine 248 then returns to step 310.

Execution engine 248 checks in step 310 if state 410 has any early during action to be executed and executes the early during action in step 328. There is no exception event thrown in the early during action in step 330 so execution engine 248 proceeds to step 302. In step 302, execution engine 248 checks if state 410 has any early transition to be considered. Early transition 422 is then identified with its corresponding condition in step 304. Execution engine 248 then evaluates the corresponding condition in step 305. The condition is evaluated to true, and the transition is made from state 410 to state 412 in step 308. Execution engine 248 proceeds to step 350 and state chart goes to sleep and waits for another event to take place.

If state 412 is active instead of state 410, then after state 408 is processed, execution engine 248 proceeds to process state 412. Execution engine 248 first checks if state 412 has any early during action to be executed in step 310 and then executes the early during action in step 328. There is no exception event thrown in the early during action in step 330 and execution engine 248 proceeds to step 302. Execution engine 248 finds that state 412 has an early transition in step 302 and identifies early transition 424 and its corresponding condition in step 304. Execution engine 248 then evaluates the corresponding condition in state 306. The condition is evaluated to false and execution engine 248 returns to step 302 to check if state 412 has another early transition that can be considered. Since state 412 only has one early transition (early transition 424), execution engine 248 proceeds to step 312 to check if the current state has any substate. However, state 412 is the leaf state of the state diagram and does not have any substate, so execution engine 248 goes to step 315 and checks if state 412 or any of its superstate has a late during action.

Execution engine 248 executes the current state's late during action in step 316 and finds that either state 412 or one of its superstates has a late transition, so execution engine 248 stops top-down processing and switches to bottom-up processing. Execution engine 248 first checks if state 412 has any late transition to be considered in step 317. State 412 does not have any late transition, and execution engine 248 proceeds to step 340 to check if state 412 has any superstate. State 412 does have a superstate, and execution engine 248 calls the superstate's late during action and makes the immediate superstate 408 the current state in step 342. Execution engine 248 returns to step 316 to execute late during action of state 408. Execution engine 248 then checks if the state 408 has any late transition to be considered in step 317. State 408 does not have any late transition so execution engine 248 proceeds to step 340 again. In step 340, execution engine 248 finds that state 408 has a superstate and proceeds to step 342 to call the superstate's late during action and make the immediate superstate 404 the current state. Execution engine 248 returns to step 316 and executes the late during action of state 404. Execution engine 248 then checks if state 404 has any late transition to be considered in step 317. State 404 finds that state 404 has a late transition and identifies late transition 416 and its corresponding condition in step 318. The corresponding condition is evaluated to true in step 324 and the transition is made from state 404 to state 402 in step 326. After transition 416 is taken, the state chart goes to sleep and waits for another event to take place in step 350.

Figure 6B:
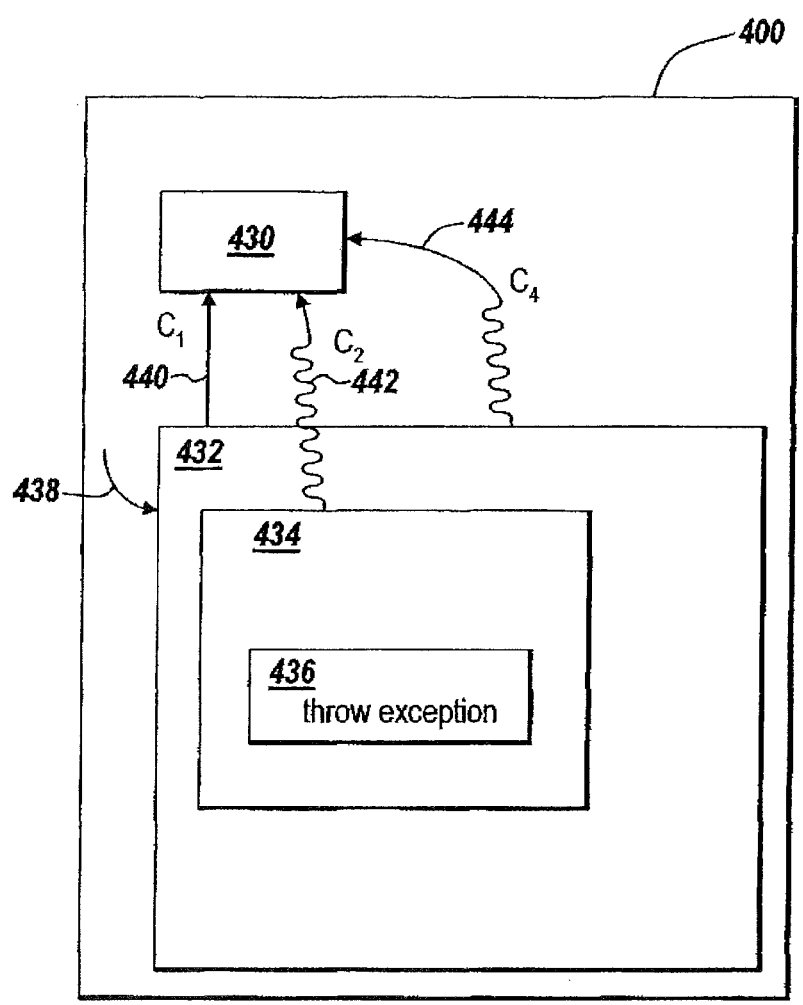
FIG. 6B illustrates another exemplary state diagram that practice one embodiment of the present invention

FIG. 6B illustrates an exemplary state diagram that practices the steps depicted in FIG. 5A and FIG. 5B. State chart 400 includes state 430 and state 432. Default transition 438 specifies that state 432 is entered instead of state 430 by default. State 432 has two transitions that start from state 432 and end at state 430. They are early transition 440 and late transition 444. Early transition 440 may be taken if condition $C_1$ is true. Late transition 444 may be taken only if no early transitions may be taken by state 432 and no other transitions may be taken by substates of state 432 when condition $C_4$ is satisfied. State 432 has a substate 434. Substate 434 has late transition 442 that lets state 434 make a transition to state 430 under condition $C_2$. Again, late transition 442 is not taken unless there is no other early transition for state 434 to take and no transitions for substates of 434 to take. State 434 has a substate 436 that does not have any transitions.

Assume that at some point during the execution, state 432, state 434, and state 436 are active. An event takes place and the state chart wakes up and identifies that the current state is state 432. The state chart initiates top-down processing from state 432 in step 352 and continues down the state hierarchy to find an early transition to take. During top-down processing, late transitions are not considered. Assuming that condition $C_1$ is not satisfied and state chart executes state 432's immediate active substate 434. Once again, the state chart cannot find any valid early transition to take from state 434 and proceeds to execute state 434's immediate active substate 436. While the state chart executes state 436, the state chart detects an exception event is thrown by state 436 in step 354. Top-down processing is then terminated in step 356 and bottom-up processing is started in step 358. State 436's superstate 434 receives the exception event in step 362. The state chart then determines if state 434 can handle the exception event in step 364. If the exception event causes condition $C_2$ to be true, then transition 442 is taken and the state chart goes back to sleep and waits for another event to take place in step 350. If condition $C_2$ is not satisfied, the state chart checks if state 434 has any superstate in step 366. The state chart finds that state 434 has superstate 432 and superstate 432 receives the exception event in step 360. Once again, the state chart determines if state 432 can handle the exception event. If condition $C_2$ is satisfied, transition 444 is taken from state 440 to state 430 in step 326. If condition $C_2$ is not satisfied, and the state chart cannot find a superstate for state 432 in step 366, the state chart throws an error event in step 368, after which the state chart goes back to sleep and wait for another event to take place in step 350.

One of ordinary skill in the art will appreciate that two-stage processing combining top-down processing and bottom-up processing is not limited to use top-down processing first and bottom-up processing second as shown in the example of Stateflow®. One may choose to use bottom-up processing first and top-down processing second. Furthermore, one may use a rule to determine when to use top-down processing or bottom-up processing in processing a finite state machine. Furthermore, one of ordinary skill in the art will appreciate that in a multiple-stage processing, any number and manner of processing may be utilized in evaluating a state machine model. One of ordinary skill in the art will also appreciate that instead of marking transitions to be associated with a particular stage, states can be marked to indicate that a particular processing method is used with a particular state.

Many alterations and modifications may be made by those having ordinary skill in the art without departing from the spirit and scope of the invention. Therefore, it must be expressly understood that the illustrated embodiments have been shown only for the purposes of example and should not be taken as limiting the invention, which is defined by the following claims. These claims are to be read as including what they set forth literally and also those equivalent elements which are insubstantially different, even though not identical in other respects to what is shown and described in the above illustrations.

What is claimed is:

1. A non-transitory computer-readable medium that stores instructions executable by at least one processor, the computer-readable medium storing one or more instructions for:
   detecting an event thrown by a first state that is part of a representation of a state machine having states and transitions, the event being thrown during a top-down processing of the representation;
   switching from the top-down processing of the representation to a bottom-up processing of the representation;
   determining that the event cannot be handled by the first state; and
   throwing the event to a second state that is part of the representation, the second state being a superstate of the first state.

2. The medium of claim 1, further storing one or more instructions for:
   processing the event at the second state.

3. The medium of claim 1, further storing one or more instructions for:
   determining that the event cannot be handled by the second state; and
   throwing the event to a third state that is part of the representation, the third state being a superstate of the second state.

4. The medium of claim 1, further storing one or more instructions for:
   determining that the event cannot be handled by the second state; and
   throwing an error event.

5. The medium of claim 1, further storing one or more instructions for:
   determining that the event can be handled by the second state; and
   taking a transition from the second state to a third state that is part of the representation.

6. The medium of claim 5, wherein the transition is a late transition.

7. The medium of claim 1, wherein the first state is associated with a transition and the transition is associated with a condition, and wherein it is determined that the event cannot be handled by the first state based on the event not causing the condition to be satisfied.

8. The medium of claim 7, further storing one or more instructions for:
   catching the event at the second state; and
   processing the event at the second state.

9. The medium of claim 7, further storing one or more instructions for:
   determining the event cannot be handled by the second state; and
   throwing the event to a third state that is part of the representation, the third state being a superstate of the second state.

10. A method comprising:
    detecting an event thrown by a first state that is part of a representation of a state machine having the first state, a second state, and transitions; and
    throwing the event to the second state, the second state being a superstate of the first state, the event being thrown to the second state when the first state is incapable of handling the event.

11. The method of claim 10, wherein the method further comprises:
catching the event at the second state; and
processing the event at the second state.

12. The method of claim 10, wherein the method further comprises:
determining the event cannot be handled by the second state; and
throwing the event to a third state that is part of the representation, the third state being a superstate of the second state.

13. The method of claim 10, further comprising:
determining that the event can be handled by the second state; and
taking a transition from the second state to a third state that is part of the representation.

14. The method of claim 13, wherein the transition is a late transition.

15. The method of claim 10, wherein the first state is associated with a transition and the transition is associated with a condition, and wherein the first state is determined as not being capable of handling the event based on the event not causing the condition to be satisfied.

16. A non-transitory computer-readable medium that stores instructions executable by at least one processor, the computer-readable medium storing one or more instructions for:
detecting an event thrown in a first state that is part of a representation of a state machine having states and transitions, the event being thrown during a top-down processing of the representation; and
throwing the event to a second state that is part of the representation, the second state being a superstate of the first state, the event being thrown to the second state based on the first state not being capable of handling the event.

17. The medium of claim 16, further storing one or more instructions for:
catching the event at the second state; and
throwing the event to a third state of the representation, the third state being a superstate of the second state.

18. The medium of claim 16, further storing one or more instructions for:
catching the event at the second state; and
throwing an error event.

19. The medium of claim 16, further storing one or more instructions for:
catching the event at the second state; and
processing the event at the second state, the processing including:
taking a transition from the second state to a third state that is part of the representation.

20. The medium of claim 19, wherein the transition is a late transition.

* * * * *